United States Patent Office 3,137,653
Patented June 16, 1964

---

3,137,653
OXAZOLE GREASE
Fritz Albert Buehler, Glassboro, N.Y., assignor to Socony Mobil Oil Company, Inc., a corporation of New York
No Drawing. Filed Mar. 14, 1961, Ser. No. 95,466
7 Claims. (Cl. 252—47.5)

This invention has to do with new grease compositions, particularly grease compositions characterized by a high order of effectiveness throughout a wide range of severe operation conditions.

For many years, there have been developments of improved greases designed to meet ever-increasing demands for effective lubrication of machinery. However with considerable progress being made in aircraft, missiles, rocktes and spacecraft, a need has arisen for greases resistant to high temperature operating conditions. Required are greases capable of functioning at temperatures in excess of 600° F.

It is an object of this invention, therefore, to provide greases capable of withstanding severe operating conditions. It is also an object to provide greases effective for high temperature use, such as 600° F. and higher. Other objects will be apparent from the following description.

This invention is predicated upon the discovery that greases of excellent character can be prepared from an oil of lubricating viscosity and an azole.

The gelling agents of this invention are oxazoles and thiazoles represented by the general formula:

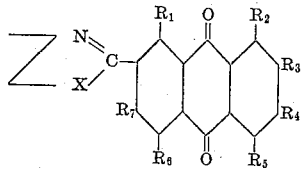

wherein Z is a substituted or unsubstituted aryl group such as phenyl, naphthyl, anthryl, anthraquinyl, etc., adjacent carbon atoms of which are attached to N and X as shown; $R_1$ through $R_7$ are hydrogen, or one or several of which is a primary or secondary amino group such as —$NH_2$,

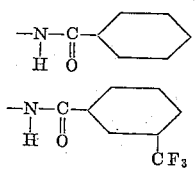

etc.; and X is either oxygen or sulfur.

Typical of such compounds are:

(1)
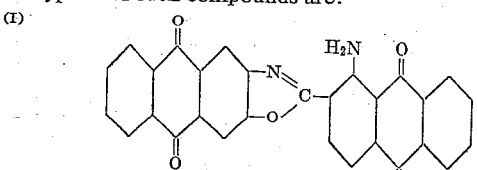

(2)
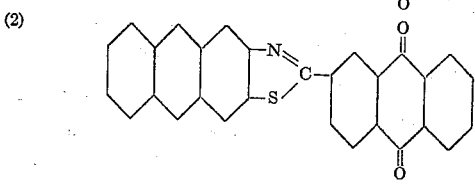

(3)
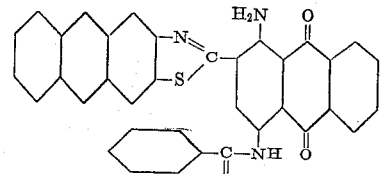

(4)
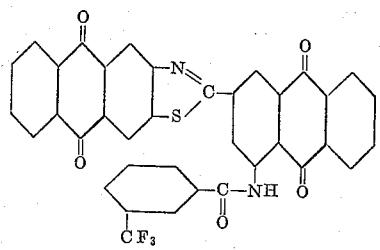

Particularly preferred herein is Vat Red No. 10 shown above as compound (1). This is available as Oxazole Red and as Indo Red Toner, products of Harmon Colors, National Aniline Division of Allied Chemical Corporation. Oxazole Red is a fine powder, having a specific gravity of 1.67, a bulking value of 13.74 pounds per gallon and an oil absorption of 42 (in a slightly bodied oil).

Methods for the preparation of the compounds contemplated herein are available in the literature and in patents. Typical methods for the preparation of one or more of such compounds are given in: U.S. Patent No. 2,244,655; British Patents Nos. 298,545 and 436,951; and German Patents Nos. 475,687 and 623,028. Reference is made to such disclosures for details in the preparation of the compounds of this invention.

While it is preferred that the compounds of this invention be used in substantially pure form (toner), it is to be understood that they can be used in the form of reduced toners. In the latter form, they are associated with an inert inorganic material such as an alumina hydrate, barium sulfate, clay, etc. When such inert inorganic materials are present, they are in amounts up to about 70 percent by weight, preferably less than about 50 percent by weight.

It is to be understood also that more than one of the compounds of this invention can be used together in a grease composition.

The compounds of this invention are stable at high temperatures, up to about 650° F. and beyond, and are well adapted for use in grease compositions formulated for high temperature operations. In this connection, they are much more effective than other pigments which have been suggested for use as grease gelling agents. Pigments found to be ineffective at 650° F. include the following:

(5)
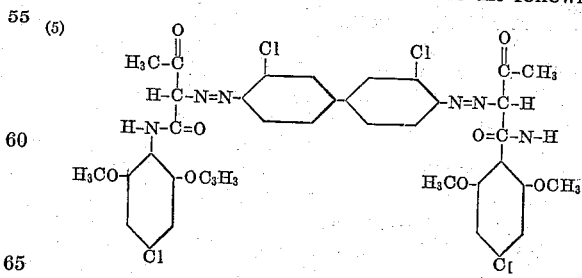

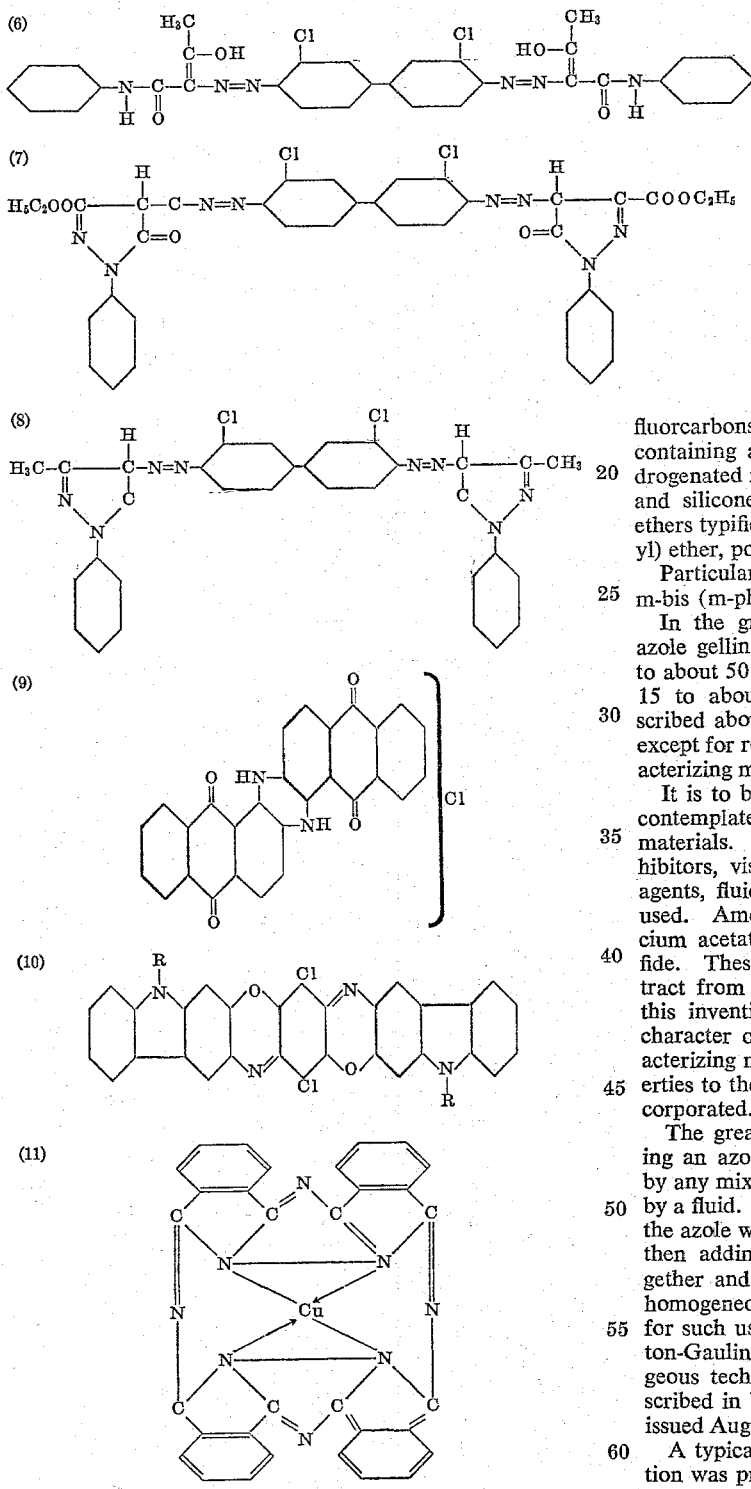

Oils used in the greases of this invention can be mineral or synthetic oils of lubricating viscosity. When high temperature stability is not a requirement of the finished grease, mineral lubricating oils can be used. Suitable mineral oils have a viscosity (S.U.V.) of at least 40 seconds at 100° F., and particularly those within the range of about 60 seconds to about 6000 seconds at 100° F.

Synthetic vehicles can be used, instead of mineral oils, or in combination therewith. Typical synthetic vehicles are: polypropylene, polypropylene glycol, trimethylol propane esters, neopentyl and pentaerythritol esters, di-(2-ethyl hexyl) sebacate, di(2-ethyl hexyl) adipate, dibutyl phthalate, polyethylene glycol di(2-ethyl hexoate), fluorcarbons, silicate esters, silanes, esters of phosphorus-containing acids, liquid ureas, ferrocene derivatives, hydrogenated mineral oils, chain type polyphenyls, siloxanes and silicones (polysiloxanes), alkyl-substituted diphenyl ethers typified by a butyl-substituted bis-(p-phenoxy phenyl) ether, polyphenyl ethers, etc.

Particularly preferred, herein, are polysiloxanes and m-bis (m-phenoxyphenoxy) benzene ether.

In the grease compositions contemplated herein, the azole gelling agents are used in quantities from about 5 to about 50 percent by weight, and preferably from about 15 to about 30 percent by weight. The vehicles described above constitute the balance of the compositions, except for relatively small quantities of the following characterizing materials which may be present.

It is to be understood, however, that the compositions contemplated herein can also contain other characterizing materials. For examples, antioxidants, corrosion inhibitors, viscosity index agents, fillers, extreme pressure agents, fluid stabilizers (e.g., iron octoate) etc., can be used. Among such materials are colloidal silica, calcium acetate, calcium carbonate and molybdenum disulfide. These characterizing materials generally do not detract from the lubricating value of the compositions of this invention, nor do they detract from the beneficial character of the oxazole compounds; rather, these characterizing materials serve to impart their customary properties to the particular compositions in which they are incorporated.

The greases of this invention are prepared by dispersing an azole in the vehicle. This may be accomplished by any mixing technique wherein solid particles are wetted by a fluid. One advantageous method involves wetting of the azole with a volatile liquid such as methyl alcohol and then adding the vehicle. The materials are milled together and warmed in order to remove the alcohol. A homogeneous product is obtained. Typical equipment for such use includes a colloid mill, 3-roll ink mill, Manton-Gaulin homogenizer and the like. Other advantageous techniques are the spray or jetting techniques described in U.S. Patent Numbers 2,950,248 and 2,950,249, issued August 23, 1960.

A typical illustrative grease composition of this invention was prepared by dispersing twenty percent by weight of compound (1) in a particular siloxane. The latter is a polymethylphenyl siloxane having a viscosity of 117 centistokes at 100° F. (Dow Corning Fluid 710). Compound (1) was wetted with methyl alcohol and the siloxane was added thereto. The materials were milled with a spatula on a glass plate until roughly homogeneous, and were warmed to drive off the alcohol. The dispersion was then milled on a Hoover Muller apparatus for four cycles each of 100 revolutions, with redistribution of the grease following each cycle.

Thickening power of an oxazole, (1) above, was determined by measuring the flow properties of the grease described above. The flow properties were measured on a Ferranti plate-and-cone viscometer. An apparent viscosity at 1000 sec.$^{-1}$ and 100° F. was taken for comparison. The grease has a value of 7.2 poises as opposed to a value of 2.98 for the siloxane alone.

The results reveal that the azoles thicken the vehicle to a greater extent than would be predicted from a crude application of the Guth-Simha modification of the Einstein equation:

$$\eta = \eta_0(1 + 2.5\phi + 14.1\phi^2)$$

wherein $\eta$ = viscosity of "grease"
$\eta_0$ = viscosity of base fluid (vehicle)
$\phi$ = volume fraction of the azole compound For example, compound (1) has a density of 1.67 and the siloxane a density of 1.07. Thus, a value of 4.8 poises would be predicted:

$$\eta = 2.98\left[1 + 2.5\left(\frac{\frac{0.2}{1.67}}{\frac{0.2}{1.67}+\frac{0.8}{1.07}}\right) + 14.1\left(\frac{\frac{0.2}{1.67}}{\frac{0.2}{1.67}+\frac{0.8}{1.07}}\right)\right]$$

$$\eta = 4.8$$

Instead of a value of 4.8, the actual value is a rather surprising 7.2.

That the azole compounds of this invention have the desired thermal stability for high temperature greases is revealed by results obtained with compound (1). The compound was dried in an oven at 220° F., 65 hours at 450° F., 20 hours at 550° F., and finally heated for 20 hours at 650° F. The compound was in the form of a fine powder when placed in an open glass beaker, when the latter was placed in the oven. At the end of the test, there was a weight loss of 2.7 percent and the compound was unchanged in appearance. When the compound was heated for an additional 20 hours at 750° F., the weight loss was 19.7 percent.

In contrast to the results obtained with compound (1), each of the compounds identified above as compounds (5) through (11) decomposed at or below 650° F.

As indicated above, the new lubricants can be used for a wide range of industrial applications. Typical applications are for lubrication of the machinery, mechanisms and vehicles mentioned above. In addition, greases constituted of the thickeners contemplated herein and of a vehicle resistant to radiation (such as a polyphenyl ether), can be used for lubrication of equipment exposed to atomic radiation harmful to lubricants.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

I claim:

1. A grease capable of functioning at temperatures as high as about 600° F. comprising an oil of lubricating viscosity and a grease-forming quantity of an azole represented by the general formula:

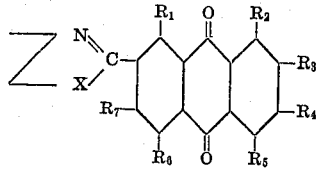

wherein Z is selected from the group consisting of unsubstituted and substituted phenyl, naphthyl, anthryl and anthraquinyl groups, adjacent carbon atoms of which are attached to N and X as shown, X is selected from the group consisting of oxygen and sulfur and $R_1$ through $R_7$ are selected from hydrogen, —$NH_2$,

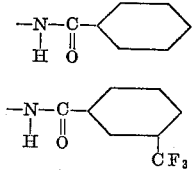

and

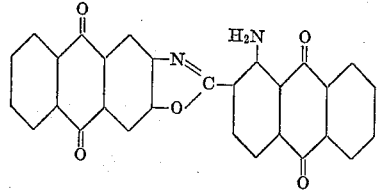

2. A grease defined by claim 1 wherein the oil is a mineral oil.
3. A grease defined by claim 1 wherein the oil is a polysiloxane.
4. A grease defined by claim 1 wherein the oil is a phenoxyphenyl ether.
5. A grease defined by claim 1 wherein the azole is:

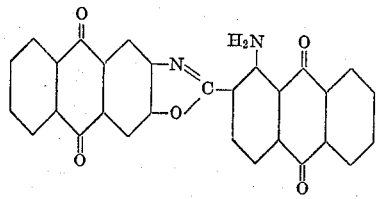

6. A grease defined by claim 1 wherein the azole is present in an amount between about 5 and about 50 percent by weight of the grease.
7. A grease comprising a polymethylphenyl siloxane and a grease-forming quantity of an azole identified as:

References Cited in the file of this patent
UNITED STATES PATENTS

| | | |
|---|---|---|
| 2,244,655 | Schlichenmaier et al. | June 3, 1941 |
| 2,985,590 | Morway et al. | May 23, 1961 |
| 3,052,632 | Loeffler | Sept. 4, 1962 |

UNITED STATES PATENT OFFICE
CERTIFICATE OF CORRECTION

Patent No. 3,137,653                          June 16, 1964

Fritz Albert Buehler

It is hereby certified that error appears in the above numbered patent requiring correction and that the said Letters Patent should read as corrected below.

Column 1, line 16, for "rccktes" read -- rockets --; column 5, lines 18 to 21, after the last closing parenthesis insert -- 2] --.

Signed and sealed this 20th day of October 1964.

(SEAL)
Attest:

ERNEST W. SWIDER                                    EDWARD J. BRENNER
Attesting Officer                                       Commissioner of Patents